Patented May 2, 1950

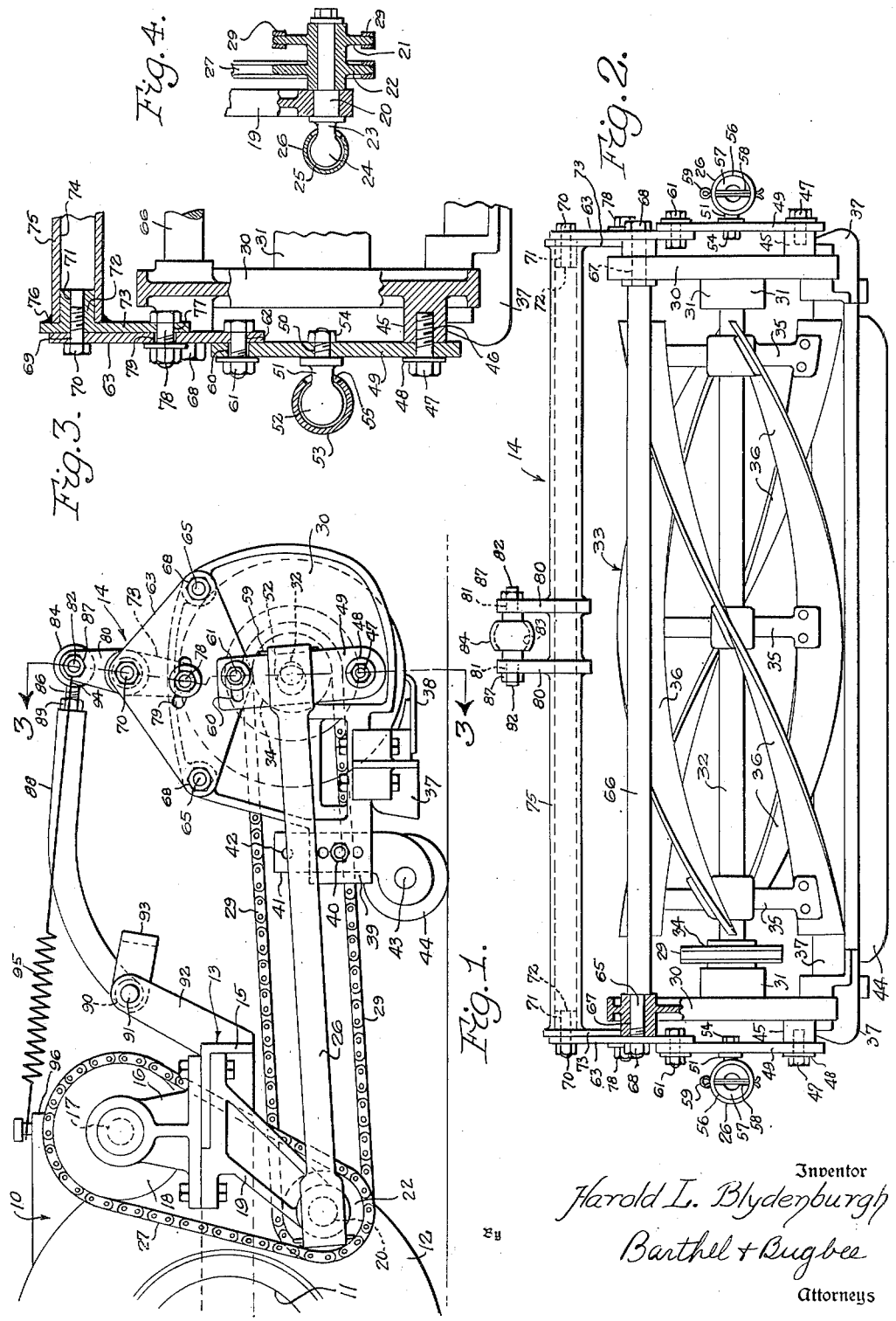

2,505,879

UNITED STATES PATENT OFFICE 2,505,879

POWER LAWN MOWER

Harold L. Blydenburgh, Highland Park, Mich., assignor to The Moto-Mower Company, Detroit, Mich., a corporation of Michigan Application January 27, 1947, Serial No. 724,640

18 Claims. (Cl. 56—26)

This invention relates to power lawnmowers, and in particular to the means for connecting and adjusting reel units relatively to power lawnmowers.

One object of this invention is to provide an improved mounting and adjusting arrangement for cutting reel units of power lawnmowers wherein the cutting reel unit is adjustable both for tightening the driver chain and for its angular position relatively to the surface of the ground being mowed.

Another object is to provide an improved mounting and adjusting arrangement for cutting reel units, as set forth in the preceding object, wherein the unit is connected to the mower frame by radius rods which swing on centers substantially co-axial with the driving sprocket and driven sprocket, so that the tension of the driving chain does not materially tighten or slacken as the cutting reel unit moves up and down while traveling over uneven ground.

Another object is to provide an improved mounting and adjusting arrangement for cutting reel units, as set forth in the preceding objects, wherein the cutting reel unit is additionally connected to the power lawnmower frame by an overhead arm which cooperates with the radius rods to permit rising and falling of the unit as it moves over hummocks or depressions in the ground being mowed.

Another object is to provide an improved mounting and adjusting arrangement for cutting reel units, as set forth in the preceding objects, wherein an adjustment is provided for swinging the cutting reel unit forward around a pivot relatively near the ground and below the pivotal connection of the radius rods so as to tighten or loosen the driving chain, and wherein an additional adjustment is provided above the connection of the radius rods for restoring the unit to its proper angle of tilt relatively to the ground such as it had before the chain tightening or loosening adjustment was made.

Other objects and advantages of the invention will become apparent during the course of the following description of the accompanying drawings, wherein:

Figure 1 is a side elevation of a cutting reel unit according to a preferred form of the invention, showing the belt tightening and tilting adjustment together with its connections to the power lawnmower frame;

Figure 2 is a front elevation of the cutting reel unit shown in Figure 1;

Figure 3 is an enlarged fragmentary substantially vertical section taken along the line 3—3 in Figure 1 and showing details of the chain-tightening and unit-tilting adjustments; and Figure 4 is a fragmentary front elevation, partly in section, of one of the radius rod brackets and its associated mechanism.

Referring to the drawings in detail, Figure 1 shows diagrammatically the forward end of a power lawnmower, generally designated 10, supported on ground wheels 11 with tires 12 thereon and having a frame generally designated 13 to which the cutting reel unit of the invention, generally designated 14, is connected and adjusted in the manner described below. The main portion of the power lawnmower 10 is conventional and its details form no part of the present invention.

As shown in Figure 1, the power lawnmower 10 at its forward end is provided with an angle member 15 forming a part of the frame 13 and having bolted thereto a pair of upstanding shaft hangers or bearing brackets 16 (one only being shown) in which is journaled a shaft 17 carrying a sprocket 18 drivingly connected by conventional mechanism (not shown) to the motor of the power lawnmower 10. Also bolted to the frame cross member 15 and extending obliquely downward therefrom is a pair of radius rod brackets 19 (one only being shown).

Mounted in the end of one of these brackets 19 (Figure 4) is a countershaft 20 carrying a pair of sprockets 21 and 22. Also mounted on the lower end of the same radius rod bracket 19 and extending horizontally outward therefrom is a member 23 having a ball head 24 thereon engaging the spherical socket 25 in the rearward end of a radius rod 26. The radius rod bracket 19, ball-head member 23, 24 and radius rod 26 are the same on the opposite side of the machine, but facing in the opposite direction. On the opposite side of the machine, however, the sprocket driven mechanism 17, 18, 20, 21 and 22 is optionally omitted, the cutting reel unit 14 being driven at one end only, as is clearly seen from Figure 2.

The sprocket 18 is drivingly connected to the sprocket 22 by an endless sprocket chain 27 and the sprocket 21 similarly carries an endless sprocket chain 29 for driving the cutting reel unit 14, as described below. Thus, the axis of the countershaft 20 is substantially co-axial with the axis of the ball-headed pivot member 23, 24 so that the upward or downward swinging of the left-hand radius rod 26 (Figures 1 and 2) does not tighten or loosen the sprocket chain 29 as the cutting reel unit 14 moves up and down while passing over hummocks or depressions in the ground being mowed.

The cutting reel unit 14 includes a pair of spaced sides or side plates 30 having bearing portions 31 in which are journaled the opposite ends of the shaft 32 of the cutting reel, generally designated 33. The cutting reel shaft 32 carries a sprocket 34 substantially aligned with the sprocket 21 and meshing with the same sprocket chain 29 so as to be driven thereby (Figure 2).

The cutting reel shaft 32 also carries spaced spiders 35 near its opposite ends and at its midportion, the outer ends of the arms of the spiders having spiral cutting blades 36 secured thereto. Bolted to the lower portions of the side plates 30 is a cutter bar support 37 (Figure 1) having a forwardly extending cutter bar 38 which cooperates with the spiral cutting blades 36 to cut the grass as it is caught between them. The side plates 30 are also provided with integral rearwardly extending portions 39 which carry bolts 40 for securing thereto the ground roller brackets 41. These are provided with spaced holes 42 for receiving the bolts 40 and providing a vertical adjustment for the brackets 41. Journaled in the lower ends of the brackets 41 is a ground roller shaft 43 carrying a ground roller 44.

The lower midportions of the side plates 30 are provided with outwardly extending bosses 45 (Figures 2 and 3) having threaded holes 46 for receiving the threaded shanks of cap screws 47. Mounted on each cap screw 47 in engagement with the end of the boss 45 and separated from the head of the cap screw 47 by a washer 48 is an upwardly-extending arm or vertical bracket 49 having a hole 50 substantially in line with the axis of the cutting reel shaft 32. Mounted in the holes 50 are the threaded shanks of shouldered pivot members 51 having ball heads 52 fitting into corresponding sockets 53 (Figure 3) in the forward ends of the radius rods 26. The pivot members 51 are held in position by nuts 54 threaded upon the threaded shanks thereof. The radius rod 26 is provided with an aperture 55 (Figure 3) through which the neck of the pivot member 51 extends and the end of the radius rod 26 is provided with a threaded bore 56 for receiving a threaded retaining nut 57 slotted as at 58 to receive a cotter pin 59 to lock it in position. The rearward end of each radius rod 26 is provided with a similar ball and socket construction to that just described, and the constructions thereof on opposite sides of the machine are also similar but of opposite hand, as shown in Figure 2.

The upper end of each arm or vertical bracket 49 is provided with an arcuate slot 60 centered upon the axis of the pivot cap screw 47 and receiving the shank of a bolt 61 passing through the slot 60 and through a hole 62 in the lower midportion of a diamond-shaped plate or vertical support 63, such plates being similarly mounted at opposite ends of the cutting reel unit 14 (Figures 2 and 3). The plates 63 are also bored as at 64 (Figures 1 and 3) to receive the threaded reduced diameter ends 65 of cross rods 66, the portions 65 also passing through bores 67 in the side plates 30. Nuts 68 mounted on the outer end of the threaded portion 65 serve to secure the diamond-shaped plates 63 to the side plates 30 and cross rods 66 (Figure 2). The upper portion of each plate 63 is bored as at 69 to receive a cap screw 70 threaded into the threaded bore 71 in the hub 72 of a downwardly extending arm 73, the hub 72 being mounted in the bore 74 of a tubular cross member 75 (Figure 3) and secured therein as by welding at 76. The lower end of each arm 73 is provided with a hole 77 for the passage of a bolt 78, the shank of which extends through an arcuate slot 79 in the intermediate portion of each diamond-shaped plate 63. The arcuate slots 79 are centered upon the axes of the bores 71 and cap screws 70.

The tubular cross member 75 at its midportion is provided with a pair of upwardly-extending spaced arms 80 (Figure 2) having aligned holes 81 for receiving the opposite ends of a shaft 82, the midportion of which carries a partial ball portion 83. The latter pivotally engages a corresponding socket portion 84 in a pivot member 85 having a threaded shank 86 extending rearwardly therefrom (Figure 1). The ball portion 83 and socket 84 for simplicity are shown as plain bearing members, whereas in the machine as actually constructed, an anti-friction self-aligning bearing member is employed at this location. Nuts 87 threaded on the end portions of the shaft 82 serve to retain the same in position relatively to the arms 80.

The rearward end of the threaded shank 86 is threaded into a correspondingly threaded bore in the forward end of a curved connecting arm 88 and locked thereto by a lock nut 89. The rearward end of the connecting arm 88 terminates in a transverse portion 90 so that the arm 88 is roughly T-shaped. The transverse portion 90 is pivotally mounted as at 91 on the upper ends of spaced arms 92 (one only being shown) secured to and extending upward from the frame cross member 15 (Figure 1). Also pivotally mounted on the portions 91 is a U-shaped member or bail 93 which is connected by mechanism not shown to a hand lever in the machine for raising and lowering the arm 88 and hence raising and lowering the cutting reel unit 14. Secured to the opposite ends of the shaft 82 are the ends 94 of coil springs 95, the opposite ends of which are anchored to the motor base 96 of the power lawnmower 10. The springs 95 serve to counterbalance the weight of the cutting reel unit 14. The arms 73, cross member 75, arms 80, shaft 82, ball and socket joint 83, 84, pivot member 85 and arm 88, 90 collectively form a connecting structure, generally designated 97, which connects the cutting reel unit 14 to the lawnmower frame 13 in the manner described above.

Operation

In the operation of the invention, let it be assumed that the driving chain 29 is too slack. To tighten the chain 29 the operator loosens the bolts 61 at the opposite ends of the cutting reel unit 14.

He then grasps the side plates 30 and pulls them forward, swinging them around the cap screws 47 as pivots and causing the shanks of the bolts 61 to move along the arcuate slots 60 until the chain 29 has been tightened sufficiently. He then applies a wrench to tighten the bolts 61 and lock the latter in their adjusted positions in the arcuate slots 60.

This operation, however, causes the side plates 30 to move forward and downward relatively to the surface of the ground being mowed, causing the cutter bar 38 to be angled downward toward the ground. To correct this and to restore the cutter bar 38 to a position more nearly parallel with the ground, the operator loosens the bolts 78. Grasping the side plates 30, he then swings these upward around the ball-headed members 51 as pivots, thereby swinging the forward edge of the cutter bar 38 upward and causing the bolts 78 to move along the arcuate slots 79 as the diamond-shaped plates 63 swing around the cap screws 70 as pivots. When the cutter bar 38 has reached the desired position of angularity relatively to the ground, the bolts 78 are tightened, locking the parts in the position of adjustment thus reached.

When the power lawnmower 10 is propelled along the ground it pushes the cutting unit 14 ahead of it and at the same time its engine drives the shaft 17 and causes the sprocket 18 and chain 27 to drive the sprocket 22 and the shaft 20. This in turn causes the sprocket 21 and chain 29 to drive the sprocket 34 on the cutting reel shaft 32, rotating the cutting reel 33 and causing its spiral blades 36 to move past the cutting edge of the cutter bar 38 and cut the grass.

As the cutting reel unit 14 encounters hummocks or depressions in the ground, it rises and falls around the ball-headed members 20 and the pivot portions 91 as pivots, the radius rods 26 and connecting arm 88 moving up and down. Since the radius rods 26 are centered on the same pivot axis as the sprocket shaft 20, the chain 29 maintains its adjustment as to tightness substantially unchanged as the cutting reel unit 14 rises and falls. While this is occurring, the coil springs 95 serve to some extent to counterbalance the weight of the cutting reel unit 14. The upward and downward motion of the cutting reel unit 14 is, of course, brought about by the contact of the ground roller 44 with the ground being mowed, thereby maintaining the cutter bar 38 at a substantially constant distance above the level of the ground.

To loosen the chain 29, the operator performs the foregoing adjustments in a reverse direction, after having loosened the bolts 61 and 78. In so doing, he grasps the side plates 30 and swings them upward around the cap screws 47 as pivots until the desired slackness of the chain 29 is obtained, whereupon he tightens the bolts 61 and then grasps the side plates 30 and swings them downward around the ball-headed members 51 as pivots in order to restore the cutter bar 38 to its proper angle of inclination relatively to the ground. During this operation, the diamond-shaped plates 63 again swing around their cap screws 70 as pivots and the bolts 78 move along the arcuate slots 79 in the reverse direction from that previously set forth in connection with tightening the chain 29.

To adjust the height of the cutter bar 38 relatively to the ground level, the operator removes the bolts 40 and raises or lowers the brackets 41, reinserting the bolts 40 through the hole 42 which places the ground roller 44 in the position which spaces the cutter bar 38 the desired distance from the ground. The bolts 40 are then tightened to lock the brackets 41 securely in their adjusted position.

As the cutting reel unit 14 moves over the ground, it is also permitted to rock laterally around the pivotal connection formed by the ball 83 and socket 85 at the end of the arm 88, such as when a hummock passes under only one end of the cutting reel unit 14. Under these conditions, the radius rod 26 on the side adjacent the hummock rises higher than the one on the opposite side as the cutting reel unit 14 tilts or rocks in a transverse direction. In this manner, the cutting reel unit 14 is so mounted as to adapt itself closely to the surface of the ground being mowed, regardless of the hummocks or depressions which it may possess.

What I claim is:

1. A connecting and adjusting mechanism for a power lawnmower cutting reel unit comprising vertical brackets pivoted to the opposite sides of said unit, radius rods pivotally connecting said mower to said brackets, a connecting structure pivotally connecting said mower to the opposite sides of said unit, and vertical supports attached to said unit sides with their upper portions pivoted to said structure and with their intermediate portions adjustably connected to said structure and with their lower portions adjustably connected to said brackets.

2. A connecting and adjusting mechanism for a power lawnmower cutting reel unit comprising vertical brackets pivoted at their lower ends to the opposite sides of said unit, radius rods pivotally connecting said mower to the intermediate portions of said brackets, a connecting structure pivotally connecting said mower to the opposite sides of said unit, and vertical supports attached to said unit sides with their upper portions pivoted to said structure and with their intermediate portions adjustably connected to said structure and with their lower portions adjustably connected to the upper portions of said brackets.

3. A connecting and adjusting mechanism for a power lawnmower cutting reel unit comprising vertical brackets pivoted to the opposite sides of said unit, radius rods pivotally connecting said mower to said brackets, a connecting structure pivotally connecting said mower to the opposite sides of said unit, and vertical supports attached to said unit sides with the upper portions pivoted to said structure and with their intermediate portions having lockable sliding connections with said structure and with their lower portions adjustably connected to said brackets.

4. A connecting and adjusting mechanism for a power lawnmower cutting reel unit comprising vertical brackets pivoted to the opposite sides of said unit, radius rods pivotally connecting said mower to said brackets, a connecting structure pivotally connecting said mower to the opposite sides of said unit, and vertical supports attached to said unit sides with their upper portions pivoted to said structure and with their intermediate portions adjustably connected to said structure and with their lower portions having lockable sliding connections with said brackets.

5. A connecting and adjustable mechanism for a power lawnmower cutting reel unit comprising vertical brackets pivoted to the opposite sides of said unit, radius rods pivotally connecting said mower to said brackets, a connecting structure pivotally connecting said mower to the opposite sides of said unit, and vertical supports attached to said unit sides with their upper portions pivoted to said structure and with their intermediate portions having lockable sliding connections with said structure and with their lower portions having lockable sliding connections with said brackets.

6. A connecting and adjusting mechanism for a power lawnmower cutting reel unit comprising vertical brackets pivoted at their lower ends to the opposite sides of said unit, radius rods pivotally connecting said mower to the intermediate portions of said brackets, a connecting structure pivotally connecting said mower to the opposite sides of said unit, and vertical supports attached to said unit sides with their upper portions pivoted to said structure and with their intermediate portions having lockable sliding connections with said structure and with their lower portions having lockable sliding connections with the upper portions of said brackets.

7. A connecting and adjusting mechanism for a power lawnmower cutting real unit comprising vertical brackets pivoted to the opposite sides of said unit, radius rods pivotally connecting said mower to said brackets, a connecting structure pivotally connecting said mower to the opposite sides of said unit and having projections extending downwardly therefrom, and vertical supports attached to said unit sides with their upper portions pivoted to said structure and with their intermediate portions adjustably connected to said projections and with their lower portions adjustably connected to said brackets.

8. A connecting and adjusting mechanism for a power lawnmower cutting reel unit comprising vertical brackets pivoted to the opposite sides of said unit, radius rods pivotally connecting said mower to said brackets, a connecting structure pivotally connecting said mower to the opposite sides of said unit and having projections extending downwardly therefrom, and vertical supports attached to said unit sides with their upper portions pivoted to said structure and with their intermediate portions having lockable sliding connections with said projections and with their lower portions adjustably connected to said brackets.

9. A connecting and adjusting mechanism for a power lawnmower cutting reel unit comprising vertical brackets pivoted to the opposite sides of said unit, radius rods pivotally connecting said mower to said brackets, a connecting structure pivotally connecting said mower to the opposite sides of said unit and having projections extending downwardly therefrom, and vertical supports attached to said unit sides with their upper portions pivoted to said structure and with their intermediate portions having lockable sliding connections with said projections and with their lower portions having lockable sliding connections with said brackets.

10. A connecting and adjusting mechanism for a power lawnmower cutting reel unit comprising vertical brackets pivoted at their lower ends to the opposite sides of said unit, radius rods pivotally connecting said mower to the intermediate portions of said brackets, a connecting structure pivotally connecting said mower to the opposite sides of said unit and having projections extending downwardly therefrom, and vertical supports attached to said unit sides with their upper portions pivoted to said structure and with their intermediate portions having lockable sliding connections with said projections and with their lower portions having lockable sliding connections with the upper portions of said brackets.

11. A connecting and adjusting mechanism for a power lawnmower cutting reel unit driven by an endless flexible member extending from a shaft on a power lawn mower to the cutting reel shaft, said mechanism comprising vertical brackets pivoted at their lower ends to the opposite sides of said unit, spaced radius rods pivoted to the opposite sides of said mower substantially co-axial with said mower shaft and pivoted to said brackets substantially co-axial with said cutting reel unit shaft, a connecting structure pivoted to said mower and to the opposite sides of said unit, and vertical supports attached to said unit sides with their upper portions pivoted to said structure and with their intermediate portions adjustably connected to said structure and with their lower portions adjustably connected to said brackets.

12. A connecting and adjusting mechanism for a power lawnmower cutting reel unit driven by an endless flexible member extending from a shaft on a power lawn mower to the cutting reel shaft, said mechanism comprising vertical brackets pivoted at their lower ends to the opposite sides of said unit, spaced radius rods pivoted to the opposite sides of said mower substantially co-axial with said mower shaft and pivoted to said brackets substantially co-axial with said cutting reel unit shaft, a connecting structure pivoted to said mower and to the opposite sides of said unit, and vertical supports attached to said unit sides with their upper portions pivoted to said structure co-axial with the pivotal connection of said structure with said unit, and with their intermediate portions adjustably connected to said structure and with their lower portions adjustably connected to said brackets.

13. A connecting and adjusting mechanism for a power lawnmower cutting reel unit driven by an endless flexible member extending from a shaft on a power lawn mower to the cutting reel shaft, said mechanism comprising vertical brackets pivoted at their lower ends to the opposite sides of said unit, spaced radius rods pivoted to the opposite sides of said mower substantially co-axial with said mower shaft and pivoted to said brackets substantially co-axial with said cutting reel unit shaft, a connecting structure pivoted to said mower and to the opposite sides of said unit and having projections extending downward from its pivotal connections with said unit, and vertical supports attached to said unit sides with their upper portions pivoted to said structure and with their intermediate portions adjustably connected to said projections and with their lower portions adjustably connected to said brackets.

14. A connecting and adjusting mechanism for a power lawnmower cutting reel unit driven by an endless flexible member extending from a shaft on a power lawn mower to the cutting reel shaft, said mechanism comprising vertical brackets pivoted at their lower ends to the opposite sides of said unit, spaced radius rods pivoted to the opposite sides of said mower substantially co-axial with said mower shaft and pivoted to said brackets substantially co-axial with said cutting reel unit shaft, a connecting structure pivoted to said mower and to the opposite sides of said unit and having projections extending downward from its pivotal connections with said unit, and vertical supports attached to said unit sides with their upper portions pivoted to said structure and with their intermediate portions having adjustable arcuately-slotted connections with said structure and with their lower portions adjustably connected to said brackets.

15. A connecting and adjusting mechanism for a power lawnmower cutting reel unit driven by an endless flexible member extending from a shaft on a power lawn mower to the cutting reel shaft, said mechanism comprising vertical brackets pivoted at their lower ends to the opposite sides of said unit, spaced radius rods pivoted to the opposite sides of said mower substantially co-axial with said mower shaft and pivoted to said brackets substantially co-axial with said cutting reel unit shaft, a connecting structure pivoted to said mower and to the opposite sides of said unit and having projections extending downward from its pivotal connections with said unit, and vertical supports attached to said unit sides with their upper portions pivoted to said structure and with their intermediate portions adjustably connected to said projections and with their lower portions having adjustable arcuately-slotted connections with said brackets.

16. A connecting and adjusting mechanism for a power lawnmower cutting reel unit driven by an endless flexible member extending from a shaft on a power lawn mower to the cutting reel shaft, said mechanism comprising vertical brackets pivoted at their lower ends to the opposite sides of said unit, spaced radius rods pivoted to the opposite sides of said mower substantially co-axial with said mower shaft and pivoted to said brackets substantially co-axial with said cutting reel unit shaft, a connecting structure pivoted to said mower and to the opposite sides of said unit and having projections extending downward from its pivotal connections with said unit, and vertical supports attached to said unit sides with their upper portions pivoted to said structure and with their intermediate portions having adjustable arcuately-slotted connections with said structure and with their lower portions having adjustable arcuately-slotted connections with said brackets.

17. A connecting and adjusting mechanism for a power lawnmower cutting reel unit driven by an endless flexible member extending from a shaft on a power lawn mower to the cutting reel shaft, said mechanism comprising vertical brackets pivoted at their lower ends to the opposite sides of said unit, spaced radius rods pivoted to the opposite sides of said mower substantially co-axial with said mower shaft and pivoted to said brackets substantially co-axial with said cutting reel unit shaft, a connecting structure pivoted to said mower and to the opposite sides of said unit, and vertical plate-like supports attached to said unit sides with their upper portions pivoted to said structure co-axial with the pivotal connection of said structure with said unit and with their intermediate portions having arcuate slots centered on said last mentioned pivotal connection and with their lower portions having arcuate slots centered on the pivotal connections of said brackets to said cutting reel unit sides.

18. A connecting and adjusting mechanism for a power lawnmower cutting reel unit having a cutting reel shaft with a driven wheel driven by an endless flexible member from a power-operated driving wheel on a shaft on a power lawnmower, said mechanism comprising spaced radius rods pivoted to the opposite sides of said mower on pivot axes substantially coaxial with said mower driving wheel shaft and pivotally connected to the sides of said unit on pivot axes substantially coaxial with said cutting reel shaft, and a connecting structure spaced apart from and above said radius rods and roughly parallel thereto, said structure having one portion thereof pivotally connected to said mower and another portion thereof pivotally connected to said cutting reel unit above and independently of the connection thereto of said radius rods.

HAROLD L. BLYDENBURGH.

REFERENCES CITED

The following references are of record in the file of this patent:

UNITED STATES PATENTS

| Number | Name | Date |
|---|---|---|
| 752,665 | Foster | Feb. 23, 1904 |
| 1,043,507 | Coldwell | Nov. 5, 1912 |
| 1,551,543 | Coldwell | Sept. 1, 1925 |
| 1,819,133 | Stegeman et al. | Aug. 18, 1931 |
| 1,886,408 | Locke et al. | Nov. 8, 1932 |
| 1,947,117 | Stegeman et al. | Feb. 13, 1934 |
| 2,143,402 | Baker | Jan. 10, 1939 |
| 2,299,859 | Speiser | Oct. 27, 1942 |
| 2,335,054 | Godwin | Nov. 23, 1943 |